Feb. 28, 1933.  J. J. DETTLING  1,899,676

METHOD OF REPAIRING TIRE CASINGS

Filed July 25, 1928

INVENTOR
Joseph J. Dettling.
BY Evans & McCoy
ATTORNEYS

Patented Feb. 28, 1933

1,899,676

UNITED STATES PATENT OFFICE

JOSEPH J. DETTLING, OF AKRON, OHIO, ASSIGNOR TO THE GENERAL TIRE & RUBBER COMPANY, OF AKRON, OHIO, A CORPORATION OF OHIO

METHOD OF REPAIRING TIRE CASINGS

Application filed July 25, 1928. Serial No. 295,143.

The present invention relates to a method of repairing tire casings and has for its most important objects to provide a repair of superior strength and durability, to provide a repair which is economical of material and which may be made at a relatively small cost and to provide a repair which effects a saving in time and labor.

In repairing cuts, blow-outs and the like in pneumatic tire casings, it has been common practice to cut away successive plies of reinforcing fabric around the damaged portion at the interior of the casing to form a stepped recess, and to fill in such recess with layers of fabric and raw rubber which are vulcanized in place. Such patches have not been as strong or as durable as is desirable for the reason that the patches tend to work loose from the body of the casing.

One of the main reasons for the failure of such patches is believed to be that the material of the patch when subjected continuously to road shocks and vibrations gradually becomes stretched until the patch has a greater area than the recess in the wall of the tire casing in which it is secured so that there is a tendency for the patch to wrinkle and for portions thereof to slide upon the portions of the tire casing to which they are secured with the result that the union between the patch and casing is gradually loosened.

This difficulty is avoided in the present invention by the use of patches which have been cut from the fabric reinforced walls of used tire casings. The rubber of such patches has been stretched or extended to substantially the same extent as that of the tires to be repaired so that there is no danger of the patch stretching to a size greater than that of the recess in which it is secured.

Furthermore, the use of patches cut from the old tire casings reduces the cost of the material used in the repair and effects considerable saving in time in making the repair, since all of the plies removed from the tire casing around the damaged portion are replaced at one time. It has also been found when patches made from old tire casings are used, that the patches may be made smaller with shorter steps between the successive plies.

The present invention also has for an object, the provision of a repair patch which is so shaped that road shocks and vibrations have little tendency to cause separation of the patch from the tire casing.

By cutting a patch of such form that the ends thereof taper substantially to a point and by applying this patch to a tire casing with the pointed ends extending circumferentially of the tire casing, road shocks are received first upon the point of the patch and are gradually tapered off toward the center of the patch so that abrupt tearing stresses are not applied along any extended edge of the patch.

With the above and other objects in view, the invention may be said to comprise the method as illustrated in the accompanying drawing hereinafter described and particularly set forth in the appended claims, together with such variations and modifications thereof as will be apparent to one skilled in the art to which the invention appertains.

Reference should be had to the accompanying drawing of this specification in which.

Figure 1:
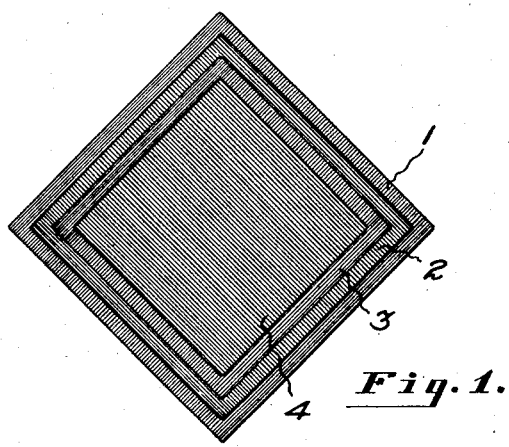
Figure 1 is a plan view of a patch such as used in repairing the tire casing by the method of the present invention.

Referring to the accompanying drawing, a tire patch cut from a used tire casing is shown in Fig. 1 and this patch consists of superposed plies 1, 2, 3 and 4 which are cut to substantially diamond shape with the plies of progressively smaller size to provide steps along each of the edges of the patch.

Figure 2:
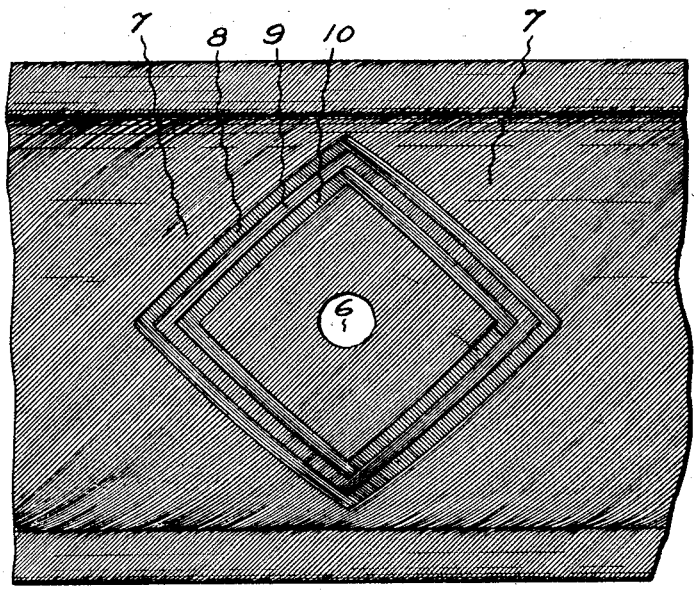
Fig. 2 is a plan view of the interior of a tire casing prepared to receive the patch shown in Fig. 1.
Figure 3:
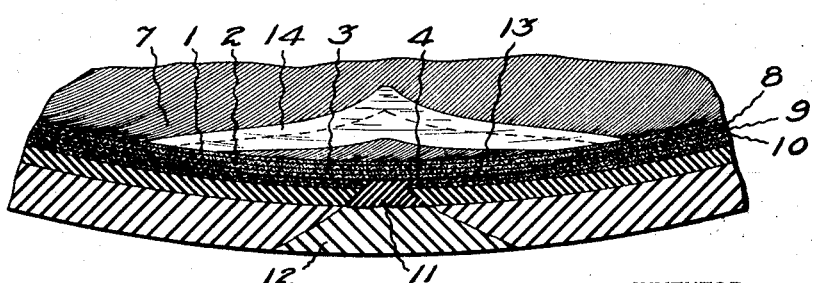
Fig. 3 is a section through a completed tire repair.

In preparing the tire casing 5 to receive the patch, the patch is laid upon the interior of the tire casing over the damaged portion such as the hole 6 shown in Fig. 2 and the casing is marked along the edges of the patch to indicate the lines of cut for removing the inner ply of the fabric around the damaged portion. A diamond shaped piece corresponding in size to the outer ply 1 of the patch is thus removed from the inner ply 7 of the tire casing. The next outer ply 8 is then cut along lines spaced inwardly from the edge of the opening of the outer ply corresponding to the space between the edge of the ply 2 of the patch and the edge of the outer ply 1 to provide an opening in the second ply 8 corresponding in size and shape to the ply 2 of the patch. The next successive plies 9 and 10 of the casing are then cut to provide openings therein corresponding in size and shape to the plies 3 and 4 of the patch. A tapered recess is thus provided upon the interior of the tire casing in which the tire patch will fit. The tire casing outwardly of the reinforced fabric is skived at an angle of from 30 to 45° to provide a tapering recess from the outer surface of the casing to the fabric reinforcement.

In preparing the tire casing for the repair, the surfaces of the tapered recess interiorly and exteriorly of the tire are thoroughly cleaned and buffed. The stepped edges of the fabric reinforcement of the tire casing and patch are then treated first with a relatively thin rubber cement and then with a heavier rubber cement. After the cement is thoroughly dry, the outer recess of the tire casing is filled with cushion stock gum 11 to the interior of the tread portion and with tread stock gum 12 to the outer surface of the tread portion. The tire patch is then applied in the inner recesses of the tire casing with a thin layer 13 of raw rubber interposed between the patch and the body of the tire casing. A thin strip of raw rubber 14 is then applied to the interior surface of the tire casing along the margin of the patch covering the adjoining edges of the outer ply 1 of the patch and the inner ply 7 of the casing, the interior of the tire casing and the outer surface of the patches having been cleaned, buffed and coated with rubber cement along the edges to which the strip 14 is applied. The repair portion is then secured in a suitable press and vulcanized.

In cutting the patch from an old tire casing, the cuts forming the edges of the patch are preferably made parallel with and at substantially right angles to the cords of the fabric and in removing the fabric from the interior of a tire casing being repaired, the cuts are made in substantially the same manner so that the patch may be fitted in the recess formed in the tire casing with the cords of successive plies of fabric of the patch extending in the same direction as the cords of the corresponding plies of the tire casing.

A repair made in accordance with the method of the present invention has great strength and durability for the reason that the patch taken from an old tire casing will not stretch to any appreciable extent after it is applied and for the further reason that the pointed ends of the patch extending circumferentially of the tire receive road shocks first at the point of the patch and gradually distribute the shocks toward the center of the patch, there being no broad edge directly presented to obstructions in the surface of the road and liable to be torn loose by impact against such obstructions.

The strength and durability of the patch is also greatly increased by the application of the thin rubber strip covering the joint between the patch and the body of the tire casing which prevents fraying of the edges and gradual separation which would otherwise occur.

It will also be apparent that the present invention effects considerable saving in the cost of making a repair, since the patch is made from scrapped tire casings and since the entire patch may be made in one piece so that all the plies are inserted simultaneously in the recess cut in the tire casing.

A further saving is effected by reason of the fact that smaller patches may be applied with shorter steps between successive plies.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. The herein described method of repairing pneumatic tire casings which comprises cutting the inner ply of the reinforcing fabric of the casing around the damaged portion thereof to form an opening in said ply which is elongated circumferentially of the tire casing and which tapers substantially to a point at both ends, two opposite sides of the opening being parallel to the cords of the ply fabric and the other two sides thereof extending substantially at right angles to said cords, cutting similar progressively smaller openings in successive plies of the reinforcing fabric to form a recess with stepped sides, applying a thin layer of raw rubber to the stepped sides of the recess, and vulcanizing in the recess a tire patch having superposed pieces of reinforcing fabric formed to fit in the openings of the plies of reinforcing fabric of the casing.

2. The herein described method of repairing pneumatic tire casings which comprises cutting the inner ply of the reinforcing fabric of the casing around the damaged portion thereof to form an opening in said ply which is elongated circumferentially of the tire casing and which tapers substantially to a point at both ends, two opposite sides of the opening being parallel to the cords of the ply fabric and the other two sides thereof extending substantially at right angles to said cords, cutting similar progressively smaller openings in successive plies of the reinforcing fabric to form a recess with stepped sides, applying a thin layer of raw rubber to the stepped sides of the recess, and vulcanizing in the recess a tire patch having superposed pieces of reinforcing fabric formed to fit in the openings of the plies of reinforcing fabric of the casing, the cords of the reinforcing fabric of the patch extending in the same direction as the cords in the corresponding plies of fabric in the tire casing.

3. The herein described method of repairing pneumatic tire casings which comprises cutting the inner ply of the reinforcing fabric of the casing around the damaged portion thereof to form an opening in said ply which is elongated circumferentially of the casing and which tapers substantially to a point at both ends, two opposite sides of the opening being parallel to the cords of the ply fabric and the other two sides thereof extending substantially at right angles to said cords, cutting similar progressively smaller openings in successive plies of the reinforcing fabric to form a recess with stepped sides, applying a thin layer of raw rubber to the stepped sides of the recess, and vulcanizing in the recess a tire patch cut from a corresponding part of a used tire casing, and having superposed pieces of fabric reinforcement of a size and shape to fit in the openings of the plies of reinforcing fabric of the casing, the cords of the reinforcing fabric of the patch extending in the same direction as the cords in the corresponding plies of fabric in the tire casing.

In testimony whereof I affix my signature.

JOSEPH J. DETTLING.